US011904719B2

(12) United States Patent
Maeda et al.

(10) Patent No.: US 11,904,719 B2
(45) Date of Patent: Feb. 20, 2024

(54) SYSTEMS AND METHODS FOR POLICING CHARGING BEHAVIOR

(71) Applicant: Honda Motor Co., Ltd., Tokyo (JP)

(72) Inventors: Eri Izumi Maeda, Rancho Palos Verdes, CA (US); David Wong Cun, Fountain Valley, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 90 days.

(21) Appl. No.: 16/775,969

(22) Filed: Jan. 29, 2020

(65) Prior Publication Data

US 2021/0229565 A1 Jul. 29, 2021

(51) Int. Cl.
*B60L 53/65* (2019.01)
*B60L 53/62* (2019.01)
*H02J 7/00* (2006.01)
*B60L 58/22* (2019.01)
*B60L 53/66* (2019.01)

(52) U.S. Cl.
CPC ............ *B60L 53/65* (2019.02); *B60L 53/62* (2019.02); *B60L 53/66* (2019.02); *B60L 58/22* (2019.02); *H02J 7/00034* (2020.01); *H02J 7/00712* (2020.01)

(58) Field of Classification Search
CPC .......... B60L 53/22; B60L 53/62; B60L 53/65; B60L 53/66; B60L 2270/30; B60L 2270/32; H02J 7/00712; H02J 7/00034
See application file for complete search history.

(56) References Cited

U.S. PATENT DOCUMENTS

| 9,296,307 | B2 | 3/2016 | Nosaka | |
|---|---|---|---|---|
| 2010/0017249 | A1* | 1/2010 | Fincham | B60L 53/665 705/412 |
| 2011/0213983 | A1* | 9/2011 | Staugaitis | B60L 58/10 713/176 |
| 2012/0150360 | A1* | 6/2012 | Kirchner | B60L 11/1848 700/297 |
| 2013/0311247 | A1 | 11/2013 | Wass et al. | |
| 2015/0202975 | A1* | 7/2015 | Solomon | H02J 13/0003 705/7.26 |
| 2019/0031038 | A1 | 1/2019 | Pursifull et al. | |
| 2019/0315236 | A1* | 10/2019 | Mere | B60L 53/57 |
| 2020/0130643 | A1* | 4/2020 | Bode | B60L 53/305 |

FOREIGN PATENT DOCUMENTS

| DE | 102016212246 | 1/2018 |
|---|---|---|
| JP | 4953147 | 6/2012 |
| KR | 101689726 | 12/2016 |
| WO | 2019052986 | 3/2019 |

* cited by examiner

*Primary Examiner* — David V Henze-Gongola
(74) *Attorney, Agent, or Firm* — RANKIN, HILL & CLARK LLP

(57) ABSTRACT

Systems and methods for policing charging behavior are provided. In one embodiment, a method includes an identification process such that a first iteration of the identification process includes identifying a first vehicle as a currently charging vehicle receiving a charge from a charging station during a current charging session. In a second iteration of the identification process includes identifying a second vehicle as the currently charging vehicle during the current charging session. The method further includes determining a difference between the first vehicle and the second vehicle. The method yet further includes modifying the current charging session based on the determined difference.

20 Claims, 4 Drawing Sheets

SYSTEMS AND METHODS FOR POLICING CHARGING BEHAVIOR

BACKGROUND

Increasingly, vehicles are designed to be recharged using charging stations. For example, electric vehicles use an electric motor to provide all or part of the mechanical drive power of the vehicle. Some types of electric vehicle can be charged from an external source via a charging station. A plugin electric vehicle may include batteries which store power from the electric grid in an electrochemical cell. To facilitate charging of electric vehicles, charging stations are often positioned in parking structures and lots. While the number of available charging stations is increasing, typically, a parking lot or structure will only have a few parking spots that can access the charging stations.

BRIEF DESCRIPTION

According to one aspect, a method for policing charging behavior is provided. The method includes an identification process such that a first iteration of the identification includes identifying a first vehicle as a currently charging vehicle receiving a charge from a charging station during a current charging session. A second iteration of the identification process includes identifying a second vehicle as the currently charging vehicle during the current charging session. The method further includes determining a difference between the first vehicle and the second vehicle. The method yet further includes modifying the current charging session based on the determined difference.

According to another aspect, a system for policing charging behavior is provided. The system includes an identification module, a difference module, and a charge module. The identification module iteratively identifies a currently charging vehicle that is receiving charge from a charging station during a current charging session. The currently charging vehicle is identified as a first vehicle in a first iteration and a second vehicle in a second iteration. The difference module determines a difference between the first vehicle and the second vehicle. The charge module modifies the current charging session based on the determined difference between the first vehicle and the second vehicle.

According to a further aspect, a non-transitory computer readable storage medium storing instructions that when executed by a computer, which includes a processor to perform a method for policing charging behavior is provided. The method including identifying a first vehicle as a currently charging vehicle that is receiving a charge from a charging station during a current charging session. The method also includes detecting a charging event during the current charging session. In response to detecting the charging event, the method includes identifying a second vehicle as the currently charging vehicle during the current charging session. The method further includes determining a difference between the first vehicle and the second vehicle. The method yet further includes modifying the current charging session based on the determined difference.

DETAILED DESCRIPTION

Some charging stations offer benefits to users. For example, some workplaces offer free charging as an employee benefit. Likewise, some retail outlets, governmental entities, theme parks, utility providers, fuel providers, entities that own and/or operate one or more various types of charging stations, fuel stations, energy stations, and/or other consumer entities, among others may offer free charging to motivate users to travel to their location. However, because public charging stations are shared, the charging stations may be fully occupied by other users. When the charging stations are full, some charging stations may allow users to queuing capability that allow a user to join a waitlist. Once a charging station is available the next user in the queue is notified. For example, a user may receive an alert on a portable device.

Figure 1:
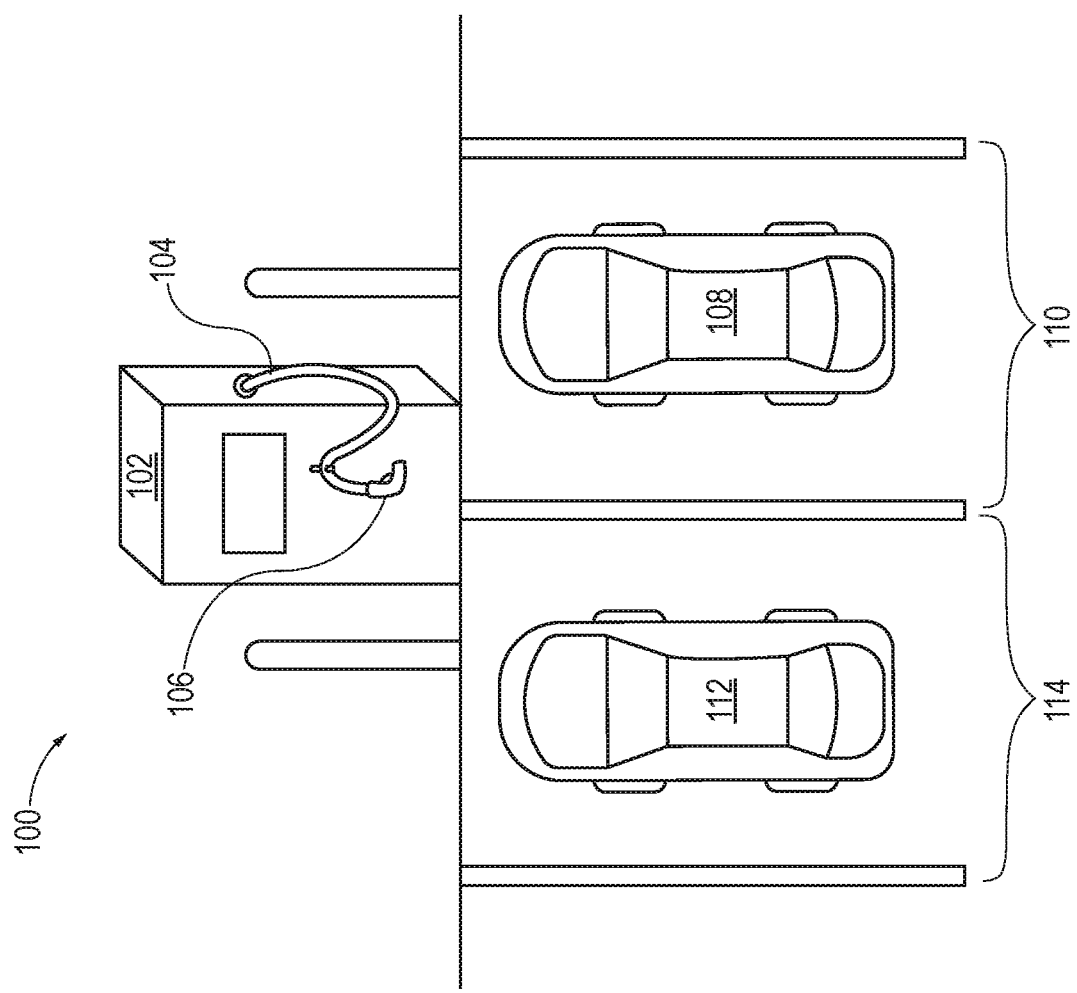
FIG. 1 is a schematic view of an exemplary parking area having a charging station according to one embodiment.

However, there are users who take advantage of benefits like free charging and queuing. For example, turning to FIG. 1, an exemplary parking area 100 having at least one charging station 102 is shown. The charging station 102 provides a currently charging vehicle with energy via a cable 104 and a connector 106. The cable 104 and the connector 106 may confer energy from the charging station 102 to the currently charging vehicle. The connector 106 is configured to plug into a corresponding port of the currently charging vehicle to electrically couple the charging station 102 and the currently charging vehicle.

A first vehicle 108 may be positioned in a first parking space 110 with access to the charging station 102. A second vehicle 112 may also be positioned nearby the charging station 102, for example, in a second parking space 114. Suppose that the first vehicle 108 is being charged by the charging station 102. When the first vehicle 108 is finished charging, a first user (not shown) of the first vehicle 108 allows the second vehicle 112 to begin charging from the charging station 102 without first completing the charging session of the first vehicle 108. In this manner, the second vehicle 112 can be charged in the same charge session as if it were the first vehicle 108, thereby conferring a benefit to the second vehicle 112 that the second vehicle 112 is not entitled to.

Returning to the example above in which an employer offers free charging, given the above described illicit behavior, a second user (not shown) of the second vehicle 112 may not be an employee of workplace but receive a free charge. Furthermore, because the charging session was not completed after the first vehicle 108, the charging station 102 does not recognize that the second vehicle 112 is different than the first vehicle 108. Accordingly, the charging station 102 will not have alerted any other vehicles waiting in queue that the charging station 102 is available and the second vehicle 112 will have "cut in line."

The systems and method provided herein, police this charging behavior by differentiating between vehicles receiving a charge from the charging station 102 so that different vehicles cannot charge under the same charging session. For example, the second vehicle 112 may be differentiated from the first vehicle 108 based on differences in the charge profiles, communication protocols, and/or physical characteristics of the respective vehicles. When illicit behavior is detected, charging may be terminated. For example, the charging station 102 may not resume a charging session after the first vehicle 108 when the second vehicle 112 is detected.

Definitions

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Charging station," as used here, refers to an access point to an energy source that a vehicle can engage to receive a charge. Accordingly, the charging station is an element in an energy infrastructure capable of transferring energy, for example, from the grid to a vehicle. The charging station may include a connector to connect to the vehicle to the charging station. For example, the charge connector may include a range of heavy duty or special connectors that conform to the variety of standards, such as DC rapid charging, multi-standard chargers, and AC fast charging, etc.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wide-band (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface," as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Station systems," as used herein can include, but is not limited to, any system that can be used to enhance the charge capability, use, and/or safety of a charging station. Exemplary station systems include, but are not limited to: a monitoring system, a vehicle identification system, a user detection system, communication system, a charge allocation system, a charge management system, a scheduling system, a sensory system, and a camera system among others.

A "user," as used herein can include, but is not limited to, one or more biological beings exerting a demand on a source of energy, such as an electrical grid. The user may be a driver or a passenger of a vehicle.

"Value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle powered wholly or partially by any form of rechargeable energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle. The autonomous vehicle can carry one or more users. Further, the term "vehicle" can include vehicles that are automated or non-automated with predetermined paths or free-moving vehicles.

I. Systems Overview

Referring now to the drawings, the showings are for purposes of illustrating one or more exemplary embodiments and not for purposes of limiting the same. As discussed above, FIG. 1 is exemplary parking area 100 including the charging station 102. An operating environment 200 facilitates differentiating between first vehicle 108 and the second vehicle 112.

Figure 2:
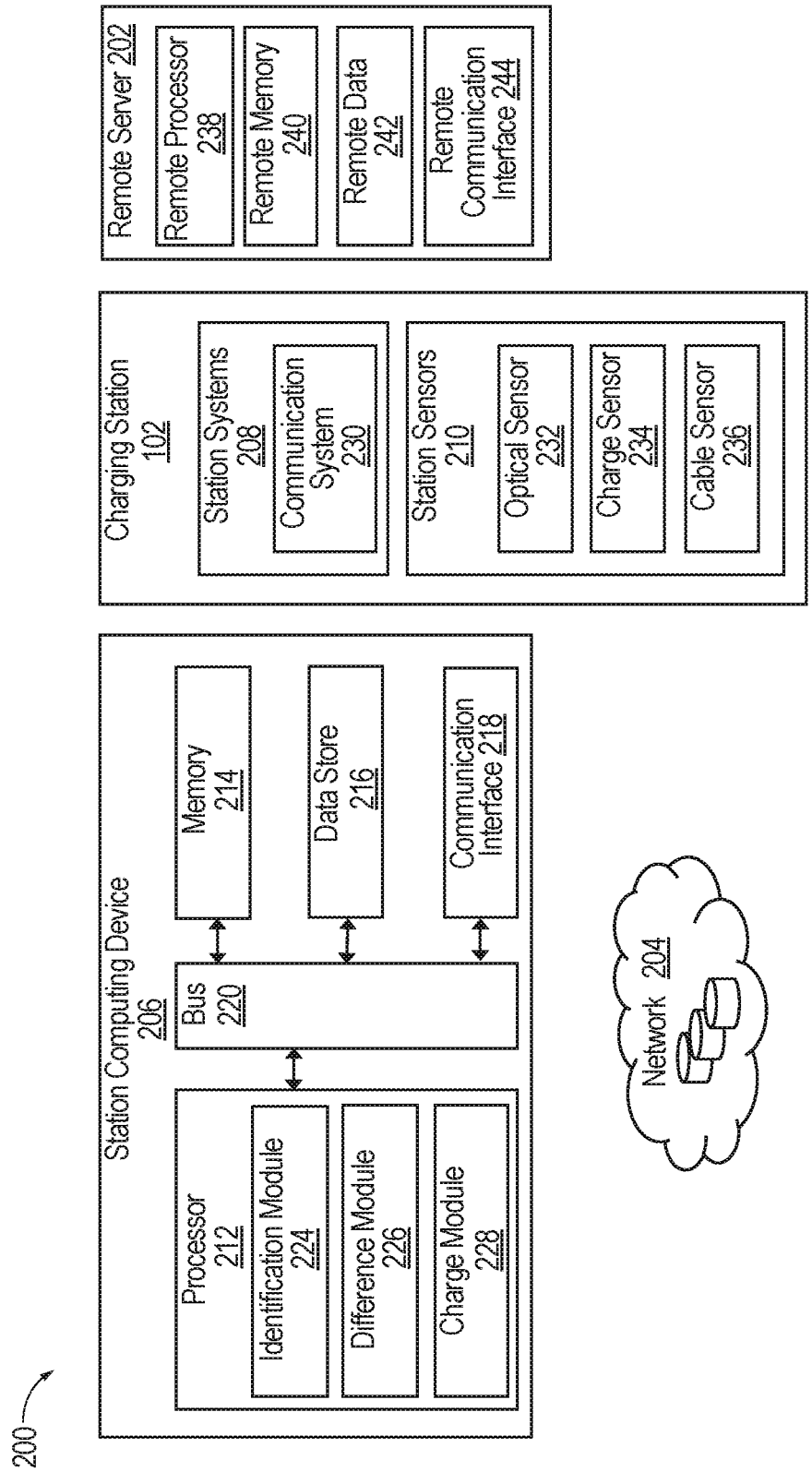
FIG. 2 is a block diagram of an operating environment for policing charging behavior according to an exemplary embodiment.

FIG. 2, a block diagram of the operating environment 200 for policing charging behavior according to an exemplary embodiment. One or more of the components of the operating environment 200 can be considered in whole or in part a vehicle communication network. The charging station 102 communicates with a remote server 202 over a network 204 and a station computing device (SCD) 206. The SCD 206 may be provided at the charging station 102, the remote server 202, or other remote location operably connected to the charging station 102 and/or the remote server 202 via the network 204. Station systems 208 and station sensors 210 communicate information about the charging station 102 to the SCD 206.

Generally, the SCD 206 includes a processor 212, a memory 214, a data store 216, and a communication interface 218, which are each operably connected for computer communication via a bus 220 and/or other wired and wireless technologies defined herein. The SCD 206, can include provisions for processing, communicating, and interacting with various components of the charging station 102 and other components of the operating environment 200. In one embodiment, the SCD 206 can be implemented with the charging station 102, for example, as part of a telematics unit, a head unit, an infotainment unit, an electronic control unit, an on-board unit, or as part of a specific control system, among others. In other embodiments, the SCD 206 can be implemented remotely from the charging station 102, for example, with a portable device (not shown) or the remote server 202, connected via the network 204.

The processor 212 can include logic circuitry with hardware, firmware, and software architecture frameworks for remote control of the charging station 102 by multiple operators. Thus, in some embodiments, the processor 212 can store application frameworks, kernels, libraries, drivers, application program interfaces, among others, to execute and control hardware and functions discussed herein. For example, the processor 212 can include an identification module 224, a difference module 226, and charge module 228 although it is understood that the processor 212 can be configured into other architectures. The memory 214 and/or the data store 216 may store data about the charging station 102, such as vehicle data including physical attributes, charging data, etc. Further, in some embodiments, the memory 214 and/or the data store 216 can store similar components as the processor 212 for execution by the processor 212.

The communication interface 218 can include software and hardware to facilitate data input and output between the components of the SCD 206 and other components of the operating environment 200. Specifically, the communication interface 218 can include network interface controllers (not shown) and other hardware and software that manages and/or monitors connections and controls bi-directional data transfer between the communication interface 218 and other components of the operating environment 200 using, for example, the network 204. More specifically, in one embodiment, the SCD 206 can exchange data and/or transmit data, such as the charging data, with other operably connected devices or other communication hardware and protocols. Thus, the SCD 206 can exchange data with a user, the charging station 102, the first vehicle 108, the second vehicle 112, and/or the remote server 202, among others. In some embodiments, the charging station 102 can also exchange data (e.g., charging data as will be described herein) over remote networks by utilizing the network 204 (e.g., a wireless communication network), or other wireless network connections.

The remote server 202 may include a remote processor 238 and/or a remote memory 240 that generate and/or store charging data. In one embodiment, the identification module 224 may access the remote data 242, such as the charging data, via the remote communications interface 244. In one embodiment, the remote server 202 and/or the SCD 206 may be communicate with a utility company, government agency, service provider or other entity that receives charging data regarding monitoring and/or meter reading via the network 204. Accordingly, the remote server 202 and/or the SCD 206 may access, store, utilize, or transmit the charging data regarding the charging station 102.

Referring again to the charging station 102, the station systems 208 can include any type of vehicle control system and/or vehicle described herein to enhance the charging station 102 and/or driving of the charging station 102. Here, the station systems 208 may include a communication system 230. The communication system 230 may facilitate communication from the charging station 102 and access the communication protocols of other entities. For example, when communicating with the first vehicle 108, the communication system 230 may determine a media access control (MAC) address of the first vehicle 108.

The station sensors 210, which can be implemented with the station systems 208, can include various types of sensors for use with the charging station 102 and/or the station systems 208 for detecting and/or sensing a parameter of the charging station 102, the station systems 208, charging data, and/or the environment surrounding the charging station 102. For example, the station sensors 210 can provide charging data about the current charge state of the charging station 102. The station sensors 210 can include, but are not limited to proximity sensors, vision sensors, motion sensors, environmental sensors, and charge sensors, among others. It is also understood that the station sensors 210 can be any type of sensor, for example, acoustic, electric, environmental, optical, imaging, light, pressure, force, moisture, thermal, temperature, proximity, among others.

Using the system and network configuration discussed above, the SCD 206 may manage charging sessions. In particular, the SCD 206 may differentiate between the first vehicle 108 and the second vehicle 112 during a single charging station. Furthermore, the SCD 206 may control the charging station 102. For example, in the event that the SCD 206 determines that multiple vehicles are attempting to receive a charge during a single charging session, the SCD 206 may cause the charging station 102 to stop charging until a new charging session is initiated. Detailed embodiments describing exemplary methods using the system and network configuration discussed above will now be discussed in detail.

II. Methods for Policing Charging Behavior

Figure 3:
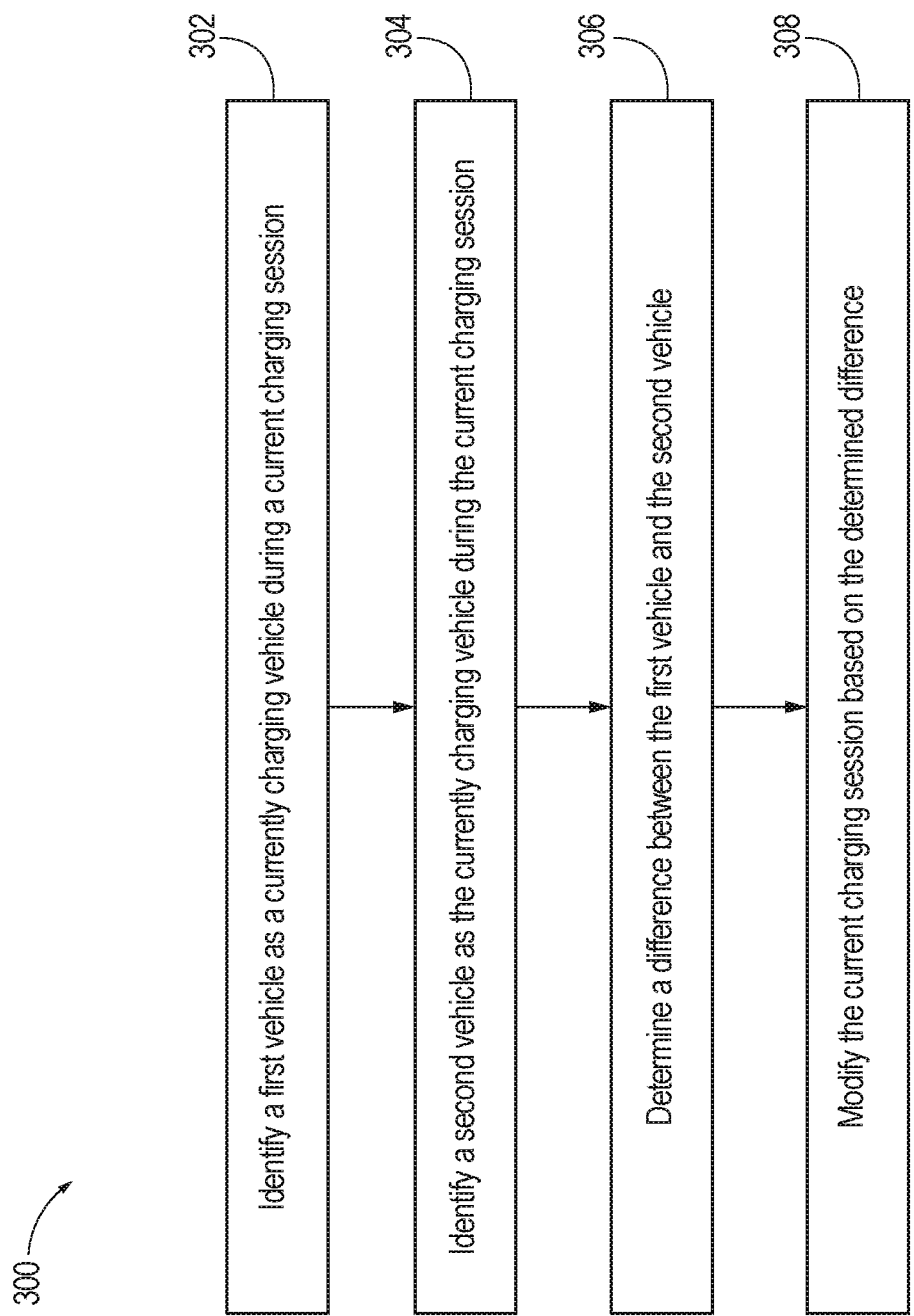
FIG. 3 is a process flow for policing charging behavior according to one embodiment.

Referring now to FIG. 3, a method 300 for policing charging behavior according to an exemplary embodiment is provided. FIG. 3 will be described with reference to FIGS. 1, 2, 4, and 5. As shown in FIG. 3, the method 300 can be described by a number of steps. For simplicity, the method 300 will be described by these steps, but it is understood that the steps of the method 300 can be organized into different architectures, blocks, stages, and/or processes.

At block 302 the method 300 includes the identification module 224 performing an identification process with a number of iterations. A first iteration of the identification process includes identifying the first vehicle 108 as a currently charging vehicle receiving a charge from the charging station 102 during a current charging session.

At block 304, the method 300 includes a second iteration of the identification process in which the identification module 224 identifies the second vehicle 112 as the currently charging vehicle during the current charging session. Therefore, the identification module 224 performs the identification process iteratively, such that in some embodiments, when the charging station 102 is engaged in a charging session, the identification module 224 may periodically identify the currently charging vehicle, for example, at the first iteration at the first time and the second iteration at a second time after the first time. The identification module 224 may identify the currently charging vehicle according to a predetermined schedule of iterations.

The current charging session may be time based or interaction based. For example, the current charging session may be defined as a charging duration by an amount of time that it takes the charging station 102 to charge the currently charging vehicle. The charging duration may be bounded by an initiation time when the charging station 102 is engaged and a completion time when the charging station 102 is disengaged. The identification module 224 receive the initiation time and the completion time as charging data. The charging station 102 may identify engagement and disengagement based on an operable connection, such as electrical connection, to the currently charging vehicle via the cable 104 and the connector 106. In one embodiment, the connector 106 may be associated with a proximity signal such that the proximity signal is transmitted when the connector 106 is within a threshold distance of a currently charging vehicle, such as the first vehicle 108 or the second vehicle 112. Accordingly, a charging session may be correspond to the time that a continuous proximity signal is received by the charging station 102 and/or the identification module 224.

In another embodiment, the identification module 224 may prompt an iteration of the identification process when the identification module 224 detects a charging event. A charging event is an anomaly in the charging session. Accordingly, a charging event may be the loss of the proximity signal which may indicate that the currently charging vehicle has been disengaged from the charging station 102. A charging event may also be a pause in charging, a power outage or black out experienced by the charging station 102. With regard to the currently charging vehicle, the charging event may be based on the draw down process when the currently charging vehicle is nearing an end of charging. An interruption to the draw down process may be identified as a charging event.

The identification module 224 may identify the first vehicle 108 and the second vehicle 112 based on direct communications. For example, the communication interface 218 may send and receive messages from the first vehicle 108 and/or the second vehicle 112 that allow the identification module 224 to identify the first vehicle 108 and/or the second vehicle 112. In one embodiment, the communication interface 218, the first vehicle 108, and/or the second vehicle 112 may include transceivers that enable communication.

The identification module 224 may additionally receive charging data from the station systems 208 and/or the station sensors 210. The communication system 230 may also include a transceiver, and thus, the charging station 102 may facilitate communication for the SCD 206. For example, the communications system 230 may send and receive messages from the first vehicle 108 and/or the second vehicle 112 that allow the identification module 224 to identify the first vehicle 108 and/or the second vehicle 112. Alternatively, the communication system 230 may identify the first vehicle 108 and/or the second vehicle 112 and transmit the identification to the identification module 224.

The identification module 224 may also receive other charging data from the station systems 208 and the station sensors 210. For example, the communication system 230 may identify a media access control (MAC) address associated with the currently charging vehicle such that a first MAC address is identified for the first vehicle 108 and a second MAC address is identified for the second vehicle 112. Alternatively, the MAC addresses may be identified by identification module 224 via the communication interface.

The charging data determined or received by the identification module 224 may include image data. For example, an optical sensor 232 may include one or more cameras that capture image data regarding the parking area 100 including the first vehicle 108 and/or the second vehicle 112. Additionally or alternatively, the identification module 224 may access or receive image data from nearby infrastructure such as roadway cameras, security cameras, speed cameras, red light cameras and traffic monitoring cameras among others.

In some embodiments, the identification module 224 may be configured to communicate with the station sensors 210, such as the optical sensor 232. The at least one camera of the optical sensor may capture image data about the first vehicle 108 and/or the second vehicle 112. The identification module 224 may receive the image data and analyze the image data to determine one or more physical attributes such as vehicle make, vehicle model, license plate number, color, model year, vehicle type (e.g., sedan, convertible, sport utility vehicle, van, coupe, etc.), and shape, among others associated with the first vehicle 108 and/or the second vehicle 112. In this manner, the identification module 224 may be configured to analyze the image data captured during the current charging session and identify charging data.

The image data may also be used to analyze the parking area 100. For example, the identification module 224 may analyze the image data to identify the parking spaces. Suppose the first vehicle 108 is in the first parking space 110. By recognizing the first parking space 110, the identification module 224 may associate the first parking space 110 with the first vehicle 108. Accordingly, the first vehicle 108 may be identified in light of its location.

The charging data may be stored with regard to specific vehicles in a charging profile that identify or can be used to identify the corresponding vehicle. For example, the first vehicle 108 may be associated with a first charging profile and the second vehicle 112 may be associated with a second charging profile. The charging profiles include charging data, including at least one charging parameter, specific to the corresponding vehicle. Generally, the charging data may be comprised of specific charging parameters associated with the vehicle to receive a charge, such as the current level of charge of the corresponding vehicle, a desired level of charge of the corresponding vehicle, a rate of consumption, historical charging data, a cost to charge the corresponding vehicle, total consumption by the corresponding vehicle, scheduling of the corresponding vehicle, charging credentials, the length of the cable 104, average time to charge the corresponding vehicle based on level of charge, the draw of the corresponding vehicle on the charging station 102, and patterns of voltage variation in the draw down process, among others.

The charging parameters, such as the above de may be received from the charge sensor 234 of the charging station 102. The charging profiles may be stored in the memory 214, the data store 216, or the remote memory 240 of the remote server 202. Furthermore, new charging data may be generated based on the charging data in the charging profiles.

At block 306, the method 300 includes the difference module 226 determining a difference between the first vehicle 108 and the second vehicle 112. The difference may be determined based on the charging data including the charge parameters, the image data, and/or the charging profile. In some embodiments, the difference is determined based on a comparison. For example, the first MAC address of the first vehicle 108 and the second MAC address of the second vehicle 112 may be compared. If the first MAC address is the same as the second MAC address, then the first vehicle 108 and the second vehicle 112 are the same currently charging vehicle. Conversely, if the first MAC address is different than the second MAC address, then the first vehicle 108 and the second vehicle 112 are different vehicles utilizing the same current charging session.

As another example, suppose that in a first iteration the identification module 224 identifies the first vehicle 108 is in the first parking space 110 and that the first vehicle 108 has one or more physical attributes, such as being red in color.

Further suppose that in the second iteration, the currently charging vehicle is blue. The image data may be analyzed by the difference module 226 may compare the colors to determine if the first vehicle 108 has changed position and the second vehicle 112 is now in the first parking space 110. The difference module 226 may further attempt to determine the location of the first vehicle 108. For example, the difference module 226 may analyze the image data to locate a vehicle matching one or more physical attributes corresponding to the first vehicle 108. Suppose the identification module 224 identifies the first vehicle 108 is in the first parking space 110 in the first iteration and in the second parking space 114 in the second iteration. The difference module 226 may determine the difference to be associated with a movement of the first vehicle 108.

In another embodiment, the difference module 226 may determine differences in the patterns of voltage variation by comparing charging parameters from the charging data. Suppose the first vehicle 108 exerts a power draw of 7 kW during the current charging session and the second vehicle exerts a power draw of 3.4 kW. In most cases, if charging of the currently charging vehicle is paused, the power draw should be the same when the charging is resumed. For example, if the first vehicle 108 is charging and the charging is paused, the charging should resume with the power draw of 7 kW. If instead, the charging resumes at 3.4 kW then it may be surmised that the second vehicle 112 has taken over charging during the current charging session. In this manner, after a charging anomaly the charging parameter from a first iteration before the charging anomaly may be compared to the charging parameters from a second iteration after the charging anomaly. Therefore, the charging parameters, such as the power draw, can be compared by the difference module 226 to determine a difference. Similarly, the difference module 226 may determine differences in the patterns of voltage variation in the draw down processes between the first vehicle 108 and the second vehicle 112.

As yet another example, a cable sensor 236 may detect a cable length of the cable 104 during the current charging session. When not engaged, the cable 104 may be coiled on a reel (not shown) within the charging station 102. When engaged, a user may extract a cable length of the cable 104 to connect the charging station 102 to a currently charging vehicle. For example, suppose that the cable sensor 236 detects that four feet of the cable 104 have been released from the charging station 102 for the first vehicle 108. In a second iteration, the cable sensor 236 may transmit that five feet of the cable has been released. By comparing the cable lengths, the difference module 226 may determine that a different vehicle, here requiring an additional length of the cable 104, has been used to engage the charging station 102.

In some embodiments, the difference module 226 may verify the determined difference by determining a secondary difference after a primary difference is determined. For example, suppose that the difference module 226 first determines that the color of the currently charging vehicle has changed from red to blue between iterations. Accordingly, the color of the currently charging vehicle is the primary difference. The difference module 226 may then select a second any difference. In one example, the secondary difference may be based on the MAC address of the currently charging vehicle. Thus, the difference module 226 may compare the MAC address of the first vehicle 108 and the second vehicle 112 to confirm that the first vehicle 108 and the second vehicle 112 are different.

The difference module 226 may verify the secondary difference in previous or subsequent iterations. Continuing the example from above, suppose that in a first iteration the first MAC address of the charging parameters is compared to the second MAC address in the second iteration. After a third iteration, the difference module 226 may compare physical attributes from identified in the third iteration to physical attributes identified in the second iteration. Accordingly, there may be any number of iterations performed in the iterative identification process.

At block 308 the method 300 includes the modifying the current charging session based on the determined difference. Suppose that it is determined that the first vehicle 108 is different than the second vehicle 112 based on the difference. Accordingly, it may be surmised that the first vehicle 108 was being charged during the current charging session and that the second vehicle 112 took over charging after the first vehicle 108 also during the current charging session. The charge module 228 may determine that not adequately ending the current charging session, but instead allowing another vehicle to take advantage of the charging parameters associated with the current charging session is illicit behavior and deal with such illicit behavior accordingly.

Suppose the difference module 226 determines a difference, the charge module 228 may modify the current charging session by terminating the current charging session thereby causing the charging station 102 to stop charging the second vehicle 112. The charge module 228 may also cause the charging station 102 to initiate a next charging session. The next charging session may have different charging parameters than the current charging session. For example, the next charging session may have a different cost to charge the second vehicle 112. In this manner, the second vehicle 112 may be prevented of reaping benefits conferred to the first vehicle 108 during the current charging session. Therefore, the systems and methods police charging behavior to prevent benefits intended for one vehicle being illicitly transferred to another.

Figure 4:
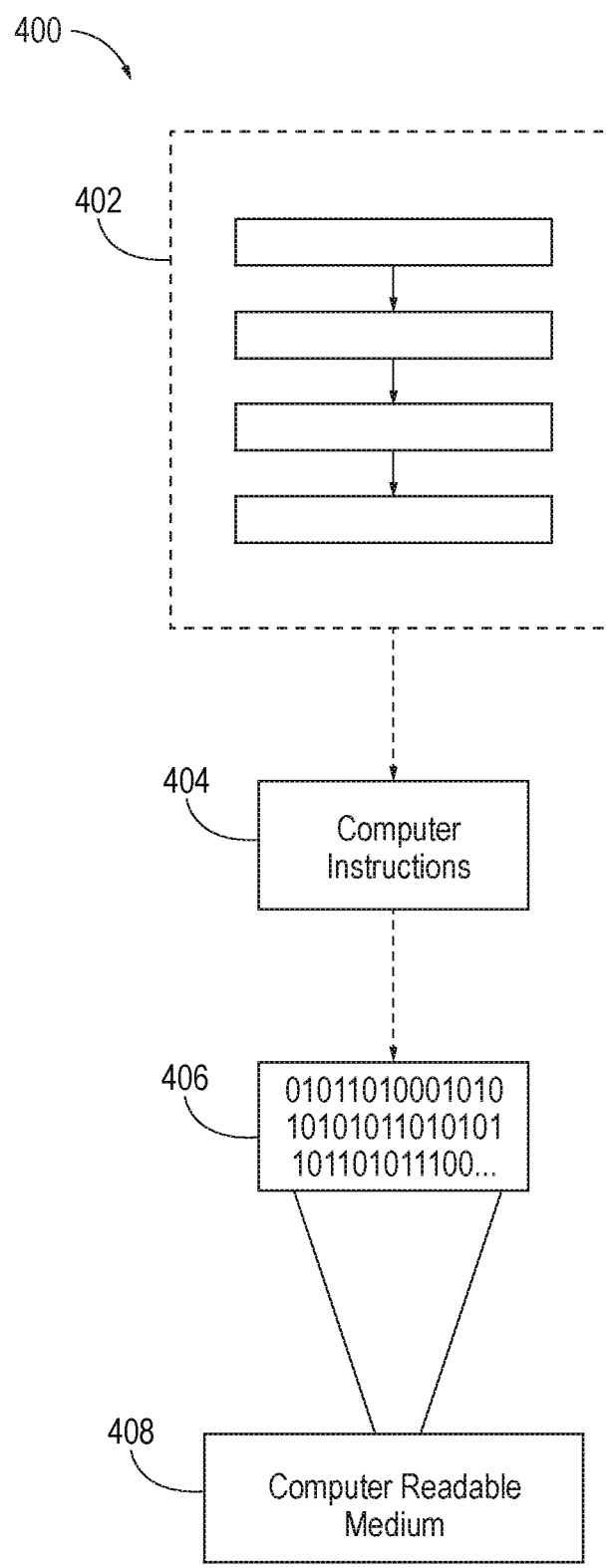
FIG. 4 is an illustration of an example computer-readable medium or computer-readable device including processor-executable instructions configured to embody one or more of the provisions set forth herein, according to one aspect.

Still another aspect of the systems and methods for police charging behavior involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation, the processor-executable computer instructions 404 may be configured to perform a method 402, such as the method 300 of FIG. 3. In another aspect, the processor-executable computer instructions 404 may be configured to implement a system, such as the operating environment of FIG. 2. Many such computer-readable media may be devised by those of ordinary skill in the art that are configured to operate in accordance with the techniques presented herein.

The term "computer readable media" as used herein includes computer storage media. Computer storage media includes volatile and nonvolatile, removable and non-removable media implemented in any method or technology for storage of information such as computer readable instructions or other data. Memory 214 and data store 216 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the SCD 206.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for policing charging behavior, comprising:
   identifying, in a first iteration of an identification process, a first vehicle as a currently charging vehicle receiving a charge from a charging station during a current charging session, wherein the first vehicle is associated a first set of vehicle data including a first charging parameter describing one or more of a first location of the first vehicle, a first physical attribute of the first vehicle, and first charging data for charging of the first vehicle, and wherein the first charging data identifies at least one electrical property associated with the charge received by the first vehicle;
   identifying, in a second iteration of the identification process, a second vehicle as the currently charging vehicle during the current charging session, wherein the second vehicle is associated a second set of vehicle data including a second charging parameter describing one or more of a second location of the second vehicle, a second physical attribute of the second vehicle, and second charging data for charging of the second vehicle, and wherein the second charging data identifies at least one electrical property associated with the charge received by the second vehicle;
   determining a first difference between the first vehicle and the second vehicle by comparing the first charging parameter of the first vehicle to the second charging parameter of the second vehicle that corresponds to the first charging parameter to determine that the first vehicle is different than the second vehicle;
   verifying the first difference by determining a second difference between the first vehicle and the second vehicle, wherein the second difference is different than the first difference; and
   modifying the current charging session in response to verifying the first difference with the second difference.

2. The method of claim 1, wherein the second iteration is prompted by a charging event, and wherein the charging event is a pause in charging the currently charging vehicle.

3. The method of claim 1, wherein modifying the current charging session includes terminating the current charging session thereby causing the charging station to stop charging the second vehicle.

4. The method of claim 1, wherein modifying the current charging session includes completing the current charging session and initiating a next charging session having different charging parameters that the current charging session.

5. The method of claim 1, further comprising:
   identifying a first media access control (MAC) address associated with the first vehicle as the first charging parameter from the first set of vehicle data; and
   identifying a second MAC address associated with the second vehicle as the second charging parameter from the second set of vehicle data,
   wherein determining the first difference or the second difference includes comparing the first MAC address to the second MAC address.

6. The method of claim 1, further comprising:
   receiving image data from station sensors of the charging station in the first set of vehicle data and the second set of vehicle data, wherein the image data includes image data associated with the first vehicle and the second vehicle, and wherein determining the first difference or the second difference includes comparing the first physical attribute of the image data associated with the first vehicle to the second physical attribute of the image data associated with the second vehicle.

7. The method of claim 1, further comprising:
   detecting a first charging profile from the first set of vehicle data stored in a memory associated with the first vehicle; and
   detecting a second charging profile from the second set of vehicle data stored in a memory associated with the second vehicle; and
   wherein determining the first difference or the second difference includes comparing the first charging profile to the second charging profile and identifying the first charging parameter in the first charging profile that is different from the second charging parameter in the second charging profile.

8. A system for policing charging behavior, comprising:
a processor;
an identification module, implemented via the processor, configured to iteratively identify a currently charging vehicle receiving charge from a charging station during a current charging session, wherein the currently charging vehicle is identified as a first vehicle in a first iteration and a second vehicle in a second iteration,
wherein the first vehicle is associated a first set of vehicle data including a first charging parameter describing one or more of a first location of the first vehicle, a first physical attribute of the first vehicle, and first charging data for charging of the first vehicle that identifies at least one electrical property associated with the charge received by the first vehicle;
wherein the second vehicle is associated a second set of vehicle data including a second charging parameter describing one or more of a second location of the second vehicle, a second physical attribute of the second vehicle, and second charging data for charging of the second vehicle, and wherein the second charging data identifies at least one electrical property associated with the charge received by the second vehicle;
a difference module, implemented via the processor, configured to determine a first difference between the first vehicle and the second vehicle by comparing the first charging parameter of the first vehicle to the second charging parameter of the second vehicle that corresponds to the first charging parameter and verifying the first difference by determining a second difference between the first vehicle and the second vehicle to determine that the first vehicle is different than the second vehicle, wherein the second difference is different than the first difference; and
a charge module, implemented via the processor, configured to modify the current charging session in response to verifying the first difference with the second difference.

9. The system of claim 8, wherein the identification module is configured to perform the second iteration in response to a pause in the current charging session.

10. The system of claim 8, wherein the charge module is configured to modify the current charging session by terminating the current charging session thereby causing the charging station to stop charging the second vehicle.

11. The system of claim 8, wherein the charge module is configured to modify the current charging session by completing the current charging session and initiating a next charging session having different charging parameters that the current charging session.

12. The system of claim 8, wherein the identification module is further configured to identify a first media access control (MAC) address associated with the first vehicle as the first charging parameter from the first set of vehicle data and a second MAC address associated with the second vehicle as the second charging parameter from the second set of vehicle data, and
wherein the difference module is configured to determine the first difference or the second difference by comparing the first MAC address to the second MAC address.

13. The system of claim 8, wherein the identification module is further configured to receive image data from station sensors of the charging station in the first set of vehicle data and the second set of vehicle data, wherein the image data includes image data associated with the first vehicle and the second vehicle, and wherein the difference module is configured to determine the first difference or the second difference by comparing the first physical attribute of the image data associated with the first vehicle to the second physical attribute of the image data associated with the second vehicle.

14. The system of claim 8, wherein the identification module is further configured to detect a first charging profile from the first set of vehicle data stored in a memory associated with the first vehicle a second charging profile from the second set of vehicle data stored in a memory associated with the second vehicle; and
wherein the difference module is further configured to determine the first difference or the second difference by comparing the first charging profile to the second charging profile and identifying first charging parameter in the first charging profile that different from the second charging parameter in the second charging profile.

15. A non-transitory computer readable storage medium storing instructions that when executed by a computer, which includes a processor to perform a method for policing charging behavior, the method comprising:
identifying a first vehicle as a currently charging vehicle receiving a charge from a charging station during a current charging session, wherein the first vehicle is associated a first set of vehicle data including a first charging parameter describing one or more of a first location of the first vehicle, a first physical attribute of the first vehicle, and first charging data for charging of the first vehicle, and wherein the first charging data identifies at least one electrical property associated with the charge received by the first vehicle;
detecting a charging event during the current charging session;
in response to detecting the charging event, identifying a second vehicle as the currently charging vehicle during the current charging session, wherein the second vehicle is associated a second set of vehicle data including a second charging parameter describing one or more of a second location of the second vehicle, a second physical attribute of the second vehicle, and second charging data for charging of the second vehicle, and wherein the second charging data identifies at least one electrical property associated with the charge received by the second vehicle;
determining a first difference between the first vehicle and the second vehicle by comparing the first charging parameter of the first vehicle to the second charging parameter of the second vehicle that corresponds to the first charging parameter to determine that the first vehicle is different than the second vehicle;
verifying the first difference by determining a second difference between the first vehicle and the second vehicle, wherein the second difference is different than the first difference; and
modifying the current charging session in response to verifying the first difference with the second difference.

16. The non-transitory computer readable storage medium of claim 15, wherein the charging event is a pause in charging the currently charging vehicle.

17. The non-transitory computer readable storage medium of claim 15, wherein modifying the current charging session includes terminating the current charging session thereby causing the charging station to stop charging the second vehicle.

18. The non-transitory computer readable storage medium of claim 15, wherein modifying the current charging session includes completing the current charging session and initiating a next charging session having different charging parameters that the current charging session.

19. The non-transitory computer readable storage medium of claim 15, further comprising:
identifying a first media access control (MAC) address associated with the first vehicle as the first charging parameter from the first set of vehicle data; and
identifying a second MAC address associated with the second vehicle as the second charging parameter from the second set of vehicle data, wherein determining the first difference or the second difference includes comparing the first MAC address to the second MAC address.

20. The non-transitory computer readable storage medium of claim 15, further comprising:
detecting a first charging profile from the first set of vehicle data stored in a memory associated with the first vehicle; and
detecting a second charging profile from the second set of vehicle data stored in a memory associated with the second vehicle; and
wherein determining the first difference or the second difference includes comparing the first charging profile to the second charging profile and identifying the first charging parameter in the first charging profile that is different from the second charging parameter in the second charging profile.

* * * * *